May 5, 1931.  V. GREGOIRE  1,804,333
STEERING WHEEL BRAKE FOR TRACTORS
Filed Sept. 13, 1929
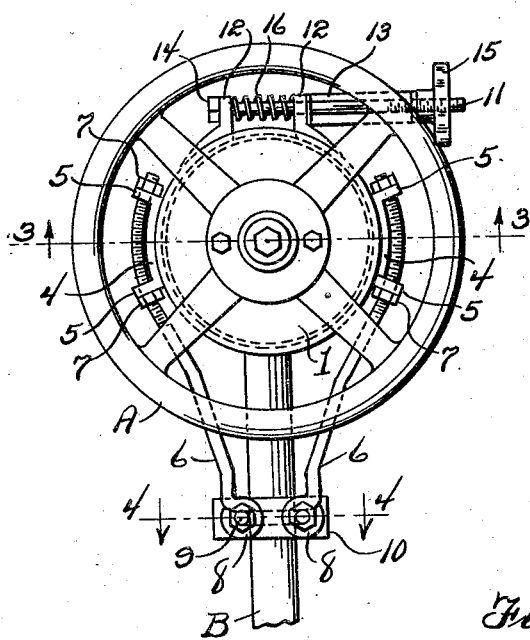
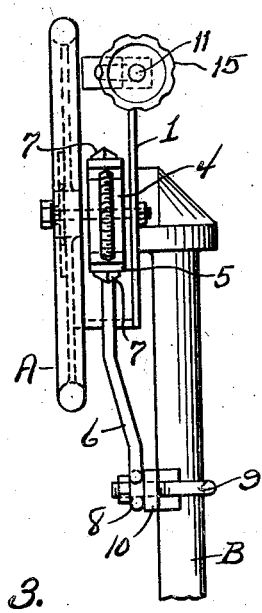
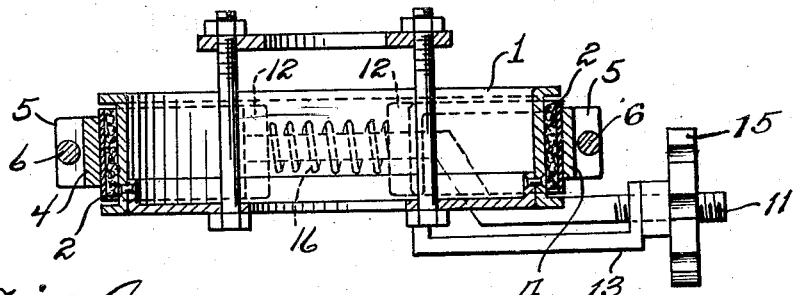
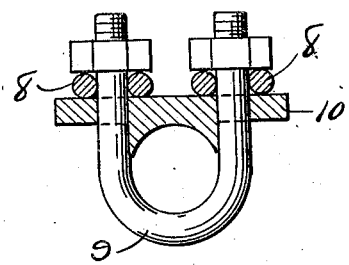
INVENTOR.
Victor Gregoire
BY
Victor J. Evans
ATTORNEY.

Patented May 5, 1931

1,804,333

UNITED STATES PATENT OFFICE

VICTOR GREGOIRE, OF LAKE ANDES, SOUTH DAKOTA

STEERING WHEEL BRAKE FOR TRACTORS

Application filed September 13, 1929. Serial No. 392,329.

This invention relates to a brake for the steering wheels of tractors and the like, the general object of the invention being to provide means whereby the steering mechanism of a tractor can be held in a certain position so that the tractor will keep its course without attention from the operator and said device will render the use of a furrow guide unnecessary when the tractor is used with a plow.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawings wherein like characters denote like or corresponding parts throughout the several views, and in which:—

Figure 1 is a front view, showing the invention in use.

Figure 2 is a side view of Figure 1.

Figure 3 is a section on line 3—3 of Figure 1.

Figure 4 is a section on line 4—4 of Figure 1.

In these views, the numeral 1 indicates a brake drum which is fastened to the rear face of the steering wheel A, and the brake band 2 of said drum has a bracket 4 attached to each side thereof which is formed with the perforated ears 5 at its ends. The threaded curved end of a rod 6 passes through the ears of each bracket and nuts 7 are placed on the rod and engage the ears so as to attach the rod to the bracket and permit the rod to be adjusted in relation to the bracket. Eyes 8 are formed on the lower ends of the rods and a U bolt 9 passes through these ears and through holes in a clamping plate 10, so that the lower ends of the rods can be clamped to the steering column B, as shown in Figures 1 and 2.

A rod 11 passes through the ears 12 formed at the ends of the band 2 and said rod also passes through the upturned ends of a bracket 13 which has one of its ends engaging one of the ears 12. Both ends of the rod are threaded and a nut 14 is placed on the inner end of the rod and contacts the second ear 12 and a hand wheel 15 is threaded on the other end of the rod. A spring 16 is placed on the rod and bears against the ears 12 and tends to hold the band in expanded position. By turning the wheel 15 in one direction, the ears are forced together so as to cause the lining on the band to grip the drum and thus hold the steering wheel against movement. By turning the hand wheel in an opposite direction, the spring 16 is permitted to expand the band so as to permit movement of the steering wheel.

From the foregoing it will be seen that the brake device can be easily and quickly attached to the steering column and wheel of a tractor or the like and as the parts are adjustable, the device can be used on different kinds of tractors. The device will act to keep the steering mechanism of a tractor or the like in adjusted position so that the tractor will keep its course without attention from the operator, thus permitting the operator to attend to other duties, and as before stated, the device renders the use of a furrow guide unnecessary.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In combination with a vehicle and its steering mechanism, a brake drum connected with the steering wheel, a band for the drum having ears thereon, adjustable means for supporting the band from the steering column, a rod passing through the ears of the band, a spring on the rod and arranged between the ears for holding the band expanded, a member on the rod having one end bearing against one of the ears, the outer end of the rod being threaded and a hand wheel on said threaded end and engaging the opposite end of said member.

2. In combination with a vehicle and its steering mechanism, a brake drum connected with the steering wheel, a band for the drum, manually operated means for contracting the band on the drum, a pair of rods adjustably connected with the band and clamping means for connecting the rods with the steering column.

In testimony whereof I affix my signature.

VICTOR GRÉGOIRE.